United States Patent [19]

Porte

[11] 3,831,317
[45] Aug. 27, 1974

[54] AGRICULTURAL SUBSTRATES

[75] Inventor: Pierre Porte, Sainte-Foy-Les-Lyon, France

[73] Assignee: Societe Rhodiaceta, Paris, France

[22] Filed: Mar. 29, 1973

[21] Appl. No.: 346,149

Related U.S. Application Data

[63] Continuation-in-part of Ser. No. 86,294, Nov. 2, 1970, abandoned.

[30] Foreign Application Priority Data

Nov. 14, 1969 France .............................. 69.39182

[52] U.S. Cl. .............. 47/58, 260/78 R, 47/DIG. 10, 47/9, 71/64 SC, 47/1.2
[51] Int. Cl. ......................... A01g 9/00, A01g 31/00
[58] Field of Search ............ 260/78 R, 75; 47/9, 58, 47/37; 71/64 G, 64 SC, DIG. 1

[56] References Cited
UNITED STATES PATENTS

| | | | |
|---|---|---|---|
| 2,830,404 | 4/1958 | Manning | 47/21 X |
| 2,976,646 | 3/1961 | Hansen et al. | 47/56 |
| 3,003,911 | 10/1961 | Linstrom et al. | 162/100 |
| 3,303,609 | 2/1967 | Machenry | 47/9 |
| 3,336,129 | 8/1967 | Herrett et al. | 47/9 X |
| 3,456,386 | 7/1969 | Holden | 47/56 |
| 3,467,609 | 9/1969 | Adams et al. | 47/37 X |

*Primary Examiner*—Robert E. Bagwill
*Attorney, Agent, or Firm*—Sherman & Shalloway

[57] ABSTRACT

A synthetic culture medium comprising a polymeric material having an apparent density of 0.01 and 0.5 and a specific surface area of between 2 and 25 m²/g, the polymeric material being in the form of an amorphous fibril. Such polymeric materials include thermoplastic polymers such as film-forming linear super polyamides, film-forming polyesters, vinly polymers, acrylonitrile base polymers, and polyolefins, the fibrils being suitable for use as a culture medium either alone or in combination with soil, sand and the like so as to provide a more readily aeratable mixture. Plant growth is improved by a process utilizing such synthetic culture medium.

7 Claims, No Drawings

AGRICULTURAL SUBSTRATES

This application is a continuation-in-part of our copending application Ser. No. 86,294 filed Nov. 2, 1970, now abandoned.

The present invention is directed to the use of thermoplastic polymeric material in fibril form as horticultural substrates. In particular, the present invention is directed to the use of thermoplastic materials in the form of agglomerates of amorphous fibrils, such materials having a specified apparent density and surface area so as to facilitate the growth of plant life therein.

Numerous attempts have been made in the past to facilitate the cultivation of the soil in regions wherein the soil has proved unsuitable for the growth of agricultural plants, i.e., in regions of the world wherein the soil is not suitable either due to lack of water, such as in the desert, or because the soil is compacted resulting from a high clay content. Much work has been done to improve the basic material available so as to both facilitate agricultural cultivation and further increase the yields which result therefrom.

As a result of such effort, it has been proposed to introduce natural materials into an unsuitable soil, such natural materials including, for example, sand, "white peat", stone, porous lava, vermiculite and the like. Such materials, when added to extremely dry and/or compacted soil, have been found, by virtue of their porosity, to improve the soil for agricultural cultivation.

The use of such materials has further been found to increase the capillarity action of the medium and, as a result, improve the absorption and retention of water of the soil. Moreover, such improved culture mediums have also been found to retain the nutrients better than the unimproved soil material. While such materials have in the past been used in connection with the improvement of the soil, they have numerous disadvantages associated therewith including the vast bulk of the additive which must be handled, the high maintenance costs relative to maintaining the soil in an improved condition, and further, the fact that it is extremely difficult to maintain a controlled moisture level in a soil medium which has been improved this way.

As a result of the disadvantages associated with the use of natural materials to improve agricultural soil medium, numerous attempts have been made to develop synthetic products and/or industrial waste materials for use in connection therewith. As a result of such efforts, industrial waste materials, such as blast furnace slags, pieces of brick, sludge, and the like, have also been used in connection with the improvement of soil condition, because of the porosity which such materials add thereto. Moreover, as a result of further efforts, synthetic products including synthetic resinous materials have also been developed for use in connection with the improvement of soil materials. For example, urea/formaldehyde resins in foam form have been added to soils to improve the water retention thereof. Such resins also proved unsuccessful, however, inasmuch as the foam form utilized does not have sufficient mechanical strength so as to maintain the porosity of the soil over a prolonged period of time, thus requiring the frequent addition thereof and the expense associated with such frequent addition.

Further, synthetic materials were also developed for use in connection with the improvement of agricultural medium including polystyrene foams, powders, and granules, polyvinyl chloride rods, and combined polymeric plastic foams. Once again, however, there have been disadvantages associated with the use of each of the above type materials. The foams noted above, which in general have good water retention, do not transmit the water gradually from the point of watering to the rootlets and young shoots so as to provide the plants growing therein with optimum growing conditions. Moreover, it is noted that such foams so not permit the penetration and retention of nutrient media therein, thus, requiring the continual replenishing thereof. In connection with porous fragments, such as powders, or granules, it is noted that such materials have been found to be subjected to the same disadvantages associated with the soil which they are designed to improve. For example, powders and granules are subject to compaction thus decreasing the flow of water from the surface to the roots resulting in a decreased growth of the plants therein. Furthermore, it is noted that several of the above materials are also subject to the growth of algae on the surface thereof which competes with the cultivated plant material for the nutrients contained in the soil. As is readily apparent, such algae growth is detrimental to the optimum growth of useful plant life and this, therefore, is a major disadvantage in connection with those materials which support such algae growth.

In addition, while some of the above additive materials do retain water, several of them do not in fact retain the water applied thereto and, as noted, do not adequately convey the water from the surface to the roots. As a result, it has been found that when one is using an artificial and/or partially artificial soil, it is necessary to maintain an abundance of water on the surface so as to maintain a controlled amount of water at the root level.

While the above-mentioned techniques in addition to other numerous techniques have been employed to facilitate the growth of agricultural products, none of the same has proved entirely satisfactory, either for the reasons noted above or as a result of other disadvantages associated with particular materials.

It is within the above environment and background that the process and product of the present invention were developed.

Briefly, the present invention is directed to a plant growth medium comprising a thermoplastic synthetic polymeric fibril having an apparent density of from 0.01 to about 0.5 and a specific surface area of from about 2 to 25 m$^2$/g, the fibril being insoluble in water at ambient temperature.

The process of the present invention comprises utilizing the growth medium of the present invention as a germination and cutting medium, either as a mixture with soil or other growth medium, either as discrete layers or in a mixture, or as a sole growth medium.

Therefore, it is an object of the instant invention to provide suitable polymeric medium for use in connection with the cultivation of plants.

Another object of the instant invention is to provide a polymeric material in suitable form for admixture with naturally occurring soil so as to improve its ability to promote the growth of plant matter.

A further object of the instant invention is to provide a polymeric material in a fibril form which is suitable either alone or in combination with soil to promote plant growth.

A still further object of the instant invention is to provide a method of improving soil, which method comprises adding to soil fibrils of polymeric materials, which fibrils improve the porosity of the soil and further facilitate the growth of the plant matter therein.

These and other objects of the present invention will become more evident from the following detailed description thereof.

As noted above, the instant invention is directed to a culture medium additive or substrate which comprises a polymeric material. In particular, the subject cultural substrate comprises at least in part a pulp which is made of a polymeric base material, which pulp is insoluble in water at ambient temperatures. Preferably, the pulp has an apparent density, as defined as the weight per unit volume of material including voids inherent in the materials as tested, of from about 0.01 to about 0.5. Those materials which have an apparent density of from about 0.04 to about 0.2 are especially preferred for use as culture substrates. In addition, the cultural substrate has a specific surface as determined by gas adsorption according to the Brunauer Emmett Teller method of from about 2 to about 25 $m^2/g$. Preferably, the cultural substrate has a specific surface area of from about 2 to about 12 $m^2/g$.

As utilized in connection herewith, the term pulp is defined as an amorphous fibril product which is obtained by the precipitation of a polymeric material from a solution thereof in a solvent by placing the solution in a bath which contains a non-solvent for the polymer. The non-solvent should be miscible with the solvent material that is utilized and, as a result of the above mixture of solvent and non-solvent, pulp fibrils result, which fibrils are then separated from the solvent and non-solvent mixture. Polymeric materials suitable for use in the production of the subject cultural substrate include film-forming linear super polyamides, film-forming polyesters, film-forming vinyl polymers, film-forming acrylonitrile base polymers, and film-forming polyolefins. Preferably, however, the film-forming linear super polyamides prepared by the polycondensation of caprolactam (Nylon 6), the condensation of hexamethylene diamine with adipic acid (Nylon 66) or with sebacic acid (Nylon 610), and those film-forming linear polyamides which are derived from 11-amino decanoic acid, 9-amino nonanoic acid, and the like are utilized. In addition, the film-forming polyesters, such as polyethylene glycol terephthalate prepared by condensing ethylene glycol with terephthalic acid may be preferably used.

According to one method for producing the fibrils of the present invention, the thermoplastic polymer solution is poured with agitation into a bath comprising a non-solvent for the polymer with the resulting pulp being separated by filtration. The pulp will then be drained, washed and dried to provide the desired end product. The pulp also may be continuously prepared by injection of a flow of the polymer containing solvent into a flow of non-solvent therefor. The resulting pulp is then obtained in the form of a "sausage" on a conveyor belt and subsequent to draining, washing and drying, the sausage form is coarsely broken up so as to form the desired amorphous fibrils.

The culture substrate of the present invention may be utilized in any one of several forms. For example, the pulp is useful either alone or in combination with other known culture mediums which include natural and/or synthetic products. When utilized in combination with soil, the pulp material is admixed with earth, preferably in a wetted form. The resulting mixture is homogenous in nature and provides an excellent medium for the growth of plant materials. The proportion of pulp utilized in connection with naturally occurring soils and/or other plant growth medium may vary over a wide range depending on the amount necessary to effect the desired degree of aeration in the ultimate soil product. Generally, an amount of pulp within the range of from about 1 to about 80 percent based on the total weight of the combination has been used. Subsequent to admixture of the pulp material with the soil and/or preparation of the pulp material alone by placing the same in a suitable container, the seedling, plant, and/or seed may then be cultivated. Subsequent to cultivation, the culture medium should be watered and supplied with an adequate amount of fertilizer. The amount of fertilizer and water utilized in connection therewith may be readily ascertained by one skilled in the art and is not critical to the method of the present invention. For example, the amount of fertilizer employed in connection with the instant culture medium should be that amount which is suitable to promote the growth of the plant material contained therein and the amount of water utilized is that amount necessary to maintain the humidity desired in the soil.

It has been found that the pulp material of the present invention not only allows germination of seeds and the growth of plants but, further, facilitates same inasmuch as it has been noted that sensitive plants which do not grow in naturally occurring soils do in fact grow successfully in the subject culture substrate and germination and rooting times are decreased.

It is also noted that the subject pulp material has a capacity for the retention of water and, further, overcomes the disadvantages of the previously known culture mediums inasmuch as it permits the water to pass through to the roots by means of capillary action. In view of such capillary action, the subject pulp material does not only retain an amount of water greater than that held by an equal weight of peat but also distributes the water to the plant very slowly according to its needs. As a result of such capillary action and water retention, the subject pulp material allows for a reduction in the frequency of watering as well as the frequency of application of fertilizer inasmuch as the pulp material retains a percentage thereof so as to allow for the prolonged utilization of such materials by the plants.

As a result of its unique physical characteristics including its density, surface area, ability to retain water and the like, the subject pulp material has been found to be an unusually effective agricultural substrate particularly useful in connection with agricultural and horticultural activities. The subject pulp fibrils may be used either as a bed for the germination of the seeds and the growth of flowers and vegetables or, further, as a mulch on a seeded aerated soil so as to slow the evaporation of water contained therein. Moreover, the subject pulp may be incorporated into a soil so as to avoid the packing thereof when water is applied by sprinkling or other sources. As previously noted, the pulp fibrils may be used alone as a culture medium without the addition of soil and/or other inert substance. If such a procedure is adopted, it is, of course, noted that one would maintain the plants, flowers, bulbs, and the like by feeding the same a balanced nutritive solution of fertilizer material as is well known in the art.

In addition, the subject pulp fibrils provide a very basic economic improvement in the cultivation of plant products. In this regard, the use of the artificial medium as disclosed herein as an agricultural substrate provides for a reduction in the number of plants which fail to survive as a result of seeding and propagation cutting. Moreover, the fibrils as disclosed herein are well suited for use in improving soils of both good quality and poor quality and, further, in facilitating the fertilization thereof. As a result of the use of the fibrils, it has been found that there is an increase in yield per square meter of soil and, further, in view of the excellent adhesion of the damp pulp to the walls and bottoms of the frame that contain the same, the frame may be handled more easily so as to increase the cultivatable surface contained therein.

The instant invention will now be illustrated by the following more detailed examples thereof wherein all growth mediums used have been sterilized. It is to be noted, however, that the instant invention is not deemed to be limited thereto.

EXAMPLE I

The pulp product of the instant invention is prepared by dissolving with agitation 10 percent by weight hexamethylene diamine polyadipate in 98 percent sulfuric acid over a period of five hours. The resulting solution is poured into an agitated bath containing a 1N aqueous solution of sodium hydroxide. The precipitate is then recovered by filtration, washed at room temperature, pressed, and dried to a uniform weight. The dry white pulp has an apparent density of 0.06 and a specific surface as determined by BET of the order of $5m^2/g$.

The pulp product of the invention is then compared to conventional substrates including fine sand, earth which comprises, 14.2 percent coarse sand, 19.3 percent fine sand, 18.8 percent very fine sant, 13.7 percent loam, 22.8 percent clay, 3.45 percent organic matter with a pH of about 7.5, compost i.e. year old humus containing partially decomposed organic wastes, and powder peat so as to determine the water retention qualities thereof. Four plastic cups of about 200 ml capacity are pierced at the base with 15 holes 1mm in diameter. Each cup is then filled with substrates which have previously been passed through a screen mesh and dipped into troughs containing 1 cm water. After 24 hours of moistening by capillary action, the cups are weighed, with the difference in weight reflecting the amount of water retained by each of the substrates.

It is noted that in connection with both compost and peat, the intake of water by capillary action is extremely slight and, therefore, so as to obtain a logical comparison, 100 g of each such substrates are soaked in 250 cc of water in a beaker. Subsequent to gentle agitation, the substance is then soaked for 24 hours, filtered to eliminate any excess and weighed. The results of the above test are tabulated in Tabel 1 below.

TABLE 1

| Substrates | Weight of Water in Grams |
|---|---|
| sand | 18.5 |
| earth | 47.7 |
| compost | 155.8 |
| peat | 825.5 |
| pulp | 1,168.1 |

As may readily be seen, the pulp of the instant invention has a water retention capacity far greater than any of the naturally occurring substances, thus leading to one of its primary advantages as a culture substrate.

EXAMPLE II

Four identical plastic cups having a 200 ml capacity are filled with fine sand, clean earth as in Example I, compost as in Example I and the pulp of the instant invention, respectively, according to the technique described in Example I. Five Orleans cress seeds are then planted in each cup so as to determine the phytotoxicity of each of the natural products relative to the pulp of the instant invention. Orleans cress is employed in as much as this plant is particularly sensitive to phytotoxic substances. Subsequent to the planting of the seeds, the contents of the cup are then watered and, at the end of six days, the number of germinated seeds counted. Each of the above tests are repeated five times and the results calculated as percentages are presented in Table 2.

TABLE 2

| Supports | % germination |
|---|---|
| sand | 56 |
| earth | 60 |
| compost | 80 |
| pulp | 92 |

As may readily be seen from the above table, the pulp product produces 92 percent germination of the seeds whereas common earth supports only 60 percent germination, thus leading to the conclusion that the pulp product has no phytotoxic substances; and, thus, represents a preferable culture support medium, even over compost, the previously preferred substrate.

EXAMPLE III

The ability of the novel substrate of the instant invention to support the initial growth of plants is ascertained by filling two terra cotta pots with rows of ten kinds of vegetable seeds and, in addition, Orleans cress. The first pot contained a control mixture comprising 50 percent by weight clean earth as in Example I, 25 percent fine sand and 25 percent compost, which mixture is placed in the pot at a thickness of 4 cm. The second pot is planted with sand to a depth of 2 cm and then a 2 cm bed of pulp as prepared in Example I. The vegetable seeds are planted to a depth of 1 to 2 mm in both pots. Table 3 indicates the type of vegetable planted, the variety and the number of seeds planted per pot.

TABLE 3

| Seeds | Varieties | Number of seeds per pot |
|---|---|---|
| lettuce | golden springtime Batavia | 30 |

TABLE 3-Continued

| Seeds | Varieties | Number of seeds per pot |
|---|---|---|
| leek | long summer | 25 |
| gourd | green market | 10 |
| tomato | Marmande | 25 |
| cabbage | early Clause | 25 |
| radish | Gaudry red with long white tip | 25 |
| spinach | Viroflay giant | 25 |
| carrot | Chantenay red | 30 |
| turnip | Milan red | 30 |
| onion | straw yellow | 25 |
| Orleans Cress | | 25 |

The plants are allowed to grow and at the end of 4, 8 and 10 days, respectively, the percentage of seedlings which have sprouted is counted. As may readily be seen from Table 4 below, the pulp product of the instant invention consistently produces an increased percentage of germination as compared to the earth, sand, and compost mixture. Furthermore, as may readily be seen, the table also demonstrates that a majority of the vegetable seeds sprouted more rapidly in the pulp medium than in a standard culture medium. It is also noted that an investigation is undertaken to determine the extent of the root system of the plants and it is found that those plants in the pulp medium have a far more extensive root system comprised of stronger roots and, further, a greater number of rootlets growing at the time of the investigation.

TABLE 4

| Seeds | earth 4 days | Sand 8 days | Compost 10 days | Pulp 4 days | Pulp 8 days | Pulp 10 days |
|---|---|---|---|---|---|---|
| lettuce | 60.0 | 66.6 | 70.0 | 76.6 | 90.0 | 93.0 |
| leek | — | 28.0 | 60.0 | — | 40.0 | 64.0 |
| gourd | — | 20.0 | 30.0 | — | 100.0 | 100.0 |
| tomato | — | 48.0 | 64.0 | — | 36.0 | 76.0 |
| cabbage | 20.0 | 92.0 | 92.0 | 4.0 | 92.0 | 92.0 |
| radish | 64.0 | 76.0 | 76.0 | 44.0 | 80.0 | 84.0 |
| spinach | — | 40.0 | 56.0 | — | 48.0 | 76.0 |
| carrot | — | 36.6 | 56.6 | — | 56.6 | 70.0 |
| turnip | 33.3 | 33.3 | 46.6 | 20.0 | 70.0 | 76.0 |
| onion | — | 16.0 | 64.0 | — | 60.0 | 76.0 |
| cress | — | 28.0 | 52.0 | — | 80.0 | 84.0 |

EXAMPLE IV

Two terra cotta pots 25 cm long, and 25 cm wide having a thickness of 5 cm are filled as follows:

The first pot has a mixture comprising equal parts by weight of earth, sand and compost, the surface of which is then planted with 100 golden Batavia springtime seeds. The above mixture of earth, sand and compost is then added to the second pot so as to establish a thickness of 4 cm. 100 grains of the same species of lettuce are then planted as above and subsequently covered with a layer of the pulp of the instant invention as prepared in Example 1 so as to provide a 1 cm thick pot layer which corresponds to a weight of 31 g of the subject pulp.

The two pots are watered until saturated and then seeds are observed for 11 days without watering. As a result of the above test, it is found that all the young lettuce plants contained in the first pot, i.e., the pot without the pulp of the instant invention, are wilted. Moreover, the plants are found to be weak and have a tendency to die off. As distinguished therefrom, the young plants of the second pot are found to have a normal growth and, further, have not begun to wilt. Moreover, the leaves are found to be bigger and the plants generally are sturdier. As a result of the above test, it is concluded that the substrate of the instant invention is advantageously used as a mulch which serves to limit the evaporation of liquid and, further, protect the delicate plants from water starvation.

EXAMPLE V

Ten flower pots 13 cm in diameter and 12 cm high are prepared by placing a 2 cm layer of pulp in the base thereof, planting in the center of the base a geranium slip, each slip being planted being of comparable strength and size. Subsequent to the planting of the slip in the center of the pot, additional pulp material is added to fill the inner volume of the pot subsequent to which granules of complete fertilizer are added at several points in a circular fashion with the slip in the center. Each planted slip is then watered until the pulp is saturated. The plants are then exposed to sunlight in atmosphere of 60 percent humidity and 25°C. temperature. At the end of three days, the appearance of small leaves are noted on all of the slips. At the end of the month, the growth noted in connection with the slips planted in the pulp of the instant invention is found to be greater than that of ten control slips taken, respectively, from the same plant as each of the first slips, which plants are placed in heath humus, i.e., a mixture of humus from the decomposition of leaves and sand having a pH between 5 and 7; and, furthermore, the growth is found to be far more vigorous than that of the control plants.

EXAMPLE VI

Ten flower pots having a diameter of 13 cm and 12 cm in height are planted with ten plants of caperatan (commonly called white cane) as in Example V. In addition, ten plants of substantially the same strength are also placed in pots containing a mixture of clean earth and heath humus. Each of the plants is watered with an amount of water sufficient to saturate the clean earth and heath humus mixture. At the end of four days, there is a noticeable softening of the upper leaves of the plant in the clean earth and heath humus mixture, which softening is noticed only after thirteen days in the case of plants growing on the synthetic culture substrate of the instant invention.

EXAMPLE VII

Two rectangular frames are prepared by filling the first with a mixture of clean soil containing only a slight amount of clay, while the second is filled with the pulp of the instant invention. Each medium is then watered until saturated and each frame is tilted with an increasing angle so as to determine the so-called "critical angle" just below that which would cause the culture medium to slide. It is found that the critical angle in connection with the soil frame is close to 20° whereas the critical angle for the pulp of the instant invention is about 45°.

The procedure is then repeated with the exception that a pulp frame, which has a length equal to that of the soil frame, has a width equal to a 1 ⅓ that of said soil frame is used. As each frame is tilted, it is found that because of the difference in critical angle, the two frames could occupy the same ground surface. The pulp frame increases the cultivatable surface 33 percent.

EXAMPLE VIII

The procedure of Examples I and II are repeated utilizing as the starting pulp material the product of the polycondensation of caprolactam, the condensation product of hexamethylene diamine and sebacic acid, a polyamide made from a 9-amino nonanionic acid, a polyamide made from 11-amino undecanoic acid, polyethylene glycol terephthalate, polyethylene, and polyvinyl chloride. In each instance, the pulp product prepared by the method of Example I is found to be far superior to a naturally occurring culture substrate.

EXAMPLE IX

Some 160 miniature rose cuttings are placed in the pulp material of Example I in February while an identical number are started in a 50 percent blond peat and 50 percent fine sand mixture as a control. The cuttings in the medium of Example I start slightly slower than those in the control but quickly overcome this lag and, at the end of one month, are taller, more vigorous and greener than the control. Further, after 45 to 50 days, the pulp propagated cuttings appear to be at least 15 days ahead of the control cuttings.

Also, upon removal from the medium, the cuttings propagated in pulp show a more developed fine root system than the control cuttings and 153 out of 160, i.e., 95.5 percent, pulp propagated cuttings are ready for potting while only 88.5 percent control propagated cuttings are ready.

When put outside in pots, the pulp cutting show better rerooting and less loss of leaves than the controls.

EXAMPLE X

Using the procedure of Example IX, 1280 cuttings are propagated in pulp and in a control medium, 50 percent peat - 50 percent sand.

Again, the pulp cuttings propagated about 10 days faster than the control cuttings. Also, the success rate is greater, i.e., 92 percent for the pulp as against 85 percent for the control. When set outside in pots, the pulp cuttings lose less leaves and behave better than the controls.

EXAMPLE XI

Some 420 rose cuttings are propagated under a mist in the pulp of Example I while a similar number are propagated in perlite. Again, the pulp cuttings propagate some 5 days faster than the perlitecuttings and have an 88 percent success factor as opposed to 82 percent for perlite.

EXAMPLE XII

Some 360 buds from Example IX are repotted, one-half in a 75 percent peat, 25 percent pulp mixture and one-half in a 75 percent peat, 25 percent perlite mixture, each containing fertilizer.

The 180 buds repotted in the pulp mixture perform better than those in the perlite mixture.

EXAMPLE XIII

Some 25 Orleans Cress seeds are sowed 1 mm deep in each of the following mixtures of pulp of Example I and the earth of Example I:
 A. 100 percent pulp;
 B. 80 percent pulp, 20 percent earth;
 C. 50 percent pulp, 50 percent earth;
 D. 20 percent pulp, 80 percent earth;
 E. 10 percent pulp, 90 percent earth;
 F. 1 percent pulp, 99 percent earth;
 G. 100 percent earth.

After six days, the Sample G produces a germination rate of 62 percent while Sample A has a rate of 91 percent. Also, Sample F, which contains only 1 percent pulp, has improved germination rate over Sample G, while Samples B-E all have greatly improved germination rates.

EXAMPLE XIV

Cultivated Paris mushrooms are planted in a conventional medium, i.e., 50 percent compost of Example I and 50 percent crushed limestone, and in a medium of 50 percent pulp and 50 percent crushed limestone. The mushrooms are watered and kept at 13°C. After 25 days, the pulp cultivated mushrooms are ready for harvesting while the conventionally cultivated mushrooms are ready in 29 days.

What is claimed is:

1. A method for improving the ability of a soil to support plant germination and growth which comprises introducing to the soil an organic material which consists essentially of a pulp of a polymeric material, said pulp having an apparent density between 0.01 and 0.5 and a specific surface area between 2 and 25 m$^2$/g, said pulp being insoluble in water at ambient temperature and being an amorphous product obtained by precipitation of a polymeric material from a solution of said polymeric material in a solvent in a bath consisting essentially of a nonsolvent for said polymeric material, said non-solvent being miscible with said solvent.

2. The process of claim 1 wherein the pulp comprises a thermoplastic polymer.

3. The process of claim 1 wherein said pulp is a polyamide.

4. The process of claim 1 wherein said pulp is a polyester.

5. The process of claim 1 wherein said pulp is intimately mixed with said soil and comprises from 1 to 80 percent by weight of the mixture.

6. The process of claim 1 wherein said pulp forms a discrete layer on said soil.

7. A method for increasing the growth ability of plants which comprises germinating seeds of said plants in a synthetic culture medium comprising a thermoplastic synthetic polymeric pulp having an apparent density of from about 0.01 to about 0.5 and a specific surface area of from about 2 to 25 m$^2$/g, said pulp being insoluble in water at ambient temperature.

* * * * *